United States Patent [19]
Bagot et al.

[11] 3,986,959
[45] Oct. 19, 1976

[54] OIL SPILL APPARATUS

[76] Inventors: Harold E. Bagot, 221 Bennett Ave., Yonkers, N.Y. 10701; Selmes Paul Funkhouser, 79th St. Boat Basin, New York, N.Y. 10024

[22] Filed: May 21, 1975

[21] Appl. No.: 579,681

[52] U.S. Cl................ 210/242 AS; 114/.5 RC; 210/DIG. 26
[51] Int. Cl.²......................................... E02B 15/04
[58] Field of Search............... 61/1 F; 114/.5 RC; 210/23 R, 30 A, 83, 170, 242, DIG. 21

[56] References Cited
UNITED STATES PATENTS

| | | | |
|---|---|---|---|
| 3,581,899 | 6/1971 | Hunter | 210/242 |
| 3,592,006 | 7/1971 | Crucet | 61/1 F |
| 3,631,679 | 1/1972 | Fisch | 61/1 F |
| 3,667,608 | 6/1972 | Burroughs et al. | 210/242 |
| 3,668,118 | 6/1972 | Rhodes | 210/30 A |
| 3,679,058 | 7/1972 | Smith | 210/242 |
| 3,700,593 | 10/1972 | Bezemer et al. | 210/242 X |
| 3,800,950 | 4/1974 | Hess et al. | 210/DIG. 21 |
| 3,804,251 | 4/1974 | Farrell et al. | 210/242 |

*Primary Examiner*—Charles N. Hart
*Assistant Examiner*—Robert G. Mukai
*Attorney, Agent, or Firm*—Kenyon & Kenyon Reilly Carr & Chapin

[57] ABSTRACT

An improved method and apparatus for removal of oil products floating on water in which a floating sponge remains essentially fixed on top of the water and bouyant squeezing means are moved over said belt to squeeze out oil picked up thereby without having to lift the sponge from the water.

5 Claims, 8 Drawing Figures

OIL SPILL APPARATUS

BACKGROUND OF THE INVENTION

This invention relates to the removal of oil products floating on water in general and more particularly to an improved method and apparatus for removing such oil using a sponge like material without removing that material from the water.

Various methods and apparatus have been developed for removing oil products floating on water. One type of these utilizes a sponge or mop which is basically oleophilic and hydrophobic. That is to say, it is a sponge which will attract oil but will not attract water. In such devices an endless belt of such material is typically formed and the endless belt moved through the water and the material containing oil removed from the belt as it is brought aboard a ship, boat or the like. Typical of such apparatus is that disclosed in U.S. Pat. No. 3,700,593 in which a porous body with an average porosity of at least 80% and comprising an organic polymer having a density between 0.85 and 1.50 such as polypropylene or polyomides is used as the sponge material. A belt of this material is rotated between two vessel or a land station and a vessel with means for squeezing the oil out of the material located on board the collecting vessel. Another similar apparatus is disclosed in U.S. Pat. No. 3,617,552. In the apparatus disclosed therein a belt moves in and out of the water, with a roller for the belt provided under water. The disclosed belt is multilayer belt with different pore sizes with a suitable material being indicated as polyurethane. Another apparatus is disclosed in U.S. Pat. No. 3,744,638. Here the endless belt runs between a vessel containing means for driving the belt and means for squeezing the oil therefrom and a buoy having a rotating drum thereon. The disclosed belt material is a polypropylene fiber. A manner of making a particularly desireable type of belt from propylene material is disclosed therein.

Another device is disclosed in U.S. Pat. No. 3,772,161 in which a plurality of chambers hold regenerable porous filler material, preferably reticulated hydrophobic foam such as polyurethane. Once again, two separate pore sizes of the foam are used. The arrangement of this apparatus is essentially the same as that in U.S. Pat. No. 3,617,552. Finally, in U.S. Pat. No. 3,679,058 an oil absorbent boom comprising porous hydrophobic foam material such as reticulated polyurethane foam and means for squeezing the oil therefrom is disclosed.

As is evidenced by the number of prior art patents relating to this subject there is a great need for apparatus of this type. The activity in this area is undoubtably due to increased concern for the environment and recent legislation association therewith. That the types of materials described in these patents work well in absorbing oil spills, is evident. However, in each of these prior methods and apparatus there is one serious deficiency. The material must be brought up out of the water laden with oil and conveyed to a squeezing area. In order to do so, it is necessary that expensive means be provided to insure that the belt or sponge has sufficient structural strength to withstand the stresses placed upon it. Even by taking these steps such belts are subject to breakage requiring replacement and at least a temporary cessation of operations. Such is clearly not desireable since oil spills can quickly spread and cause serious damage to beaches and to the ocean where oil pollution is particularly damaging.

In another attempt to solve this problem in the prior art, a plurality of relatively small sponges, i.e. of about the the size of a fist, were shot into the water and then picked up, and the oil squeezed therefrom. Afterwards, they were again placed in the water. Size obviously was kept small because even a small sponge full of oil becomes extremely heavy. Thus, to pick a large sponge out of the water entails great difficulty.

More significantly, these prior art devices are not capable of picking up extremely large oil spills. Oil spills of 30 to 85 thousand tons have occurred recently and with the advent of large supertankers spills even in excess of this amount can possibly occur. In such a case, a particularly large absorbent belt which would have to extend for 5 miles or more and which can be used in the open seas or a plurality of larges sponges would be necessary. It is quite evident that belts and sponges of these dimensions can not be handled by presently existing apparatus.

In view of this, the need for an improved method and apparatus for removing oil products floating on water, i.e., for picking up oils spills, becomes evident.

SUMMARY OF THE INVENTION

The present invention provides such a method and apparatus. To avoid the difficulties associated with the prior art apparatus the apparatus of the present invention starts out with a sponge which need not be picked out of the water. In other words, the sponge remains in the water floating on top thereof absorbing the oil. To remove the oil which is absorbed, a buoyant squeezing apparatus is moved along the length of the sponge squeezing out the oil therefrom. Means are provided to pump or draw the oil removed from the sponge to a suitable holding tank.

The actual implementation of the present invention may take many forms. For example, where the spill is on a river, a sponge belt according to the present invention can be stretched across the river down stream from the spill with the ends of the belt affixed on the two river banks. What is meant by a belt herein is any elongated structure the major portion of which consists of sponge material. Thus, a belt may comprise a single elongated rectangular, circular, square, etc., sponge or may comprise a plurality of smaller sponges strung together to form a belt. Various shapes and sizes of sponges may be so strung, they may be square, rectangular, spherical, cylindrical, etc. The buoyant apparatus for squeezing the oil from the belt can then be drawn back and forth thereacross using cables and winches or the like with a vacuum connection attached thereto to suck the oil from the buoyant squeezing device to a suitable container on the shore. Similarly, the belt can be attached between two buoys anchored in the water. Or it can be attached between a barge and buoy, or two barges, with one or more of the barges providing receptacles for the oil removed. In such cases, the barges can be towed or can be self propelled to move the belt through an oil spill area one or more times until all oil in the surface is removed.

However, a particularly advantageous embodiment of the present invention utilizes a technique for sweeping the oil which is somewhat equivalent to the the technique for mine sweeping. Much in the manner in which a mine sweeper is outfitted, a ship or boat is outfitted with floats on either one or both sides. The sponge belt is arranged coupled to at least one of the floats and another float, either a float on the other side or a float directly astern the vessel so that it is perpendicular to the direction of travel of the vessel. The buoyant squeezing apparatus is then driven between the two floats supporting the belt to continually squeeze the oil therefrom as the vessel sweeps the area of the oil spill. In such a case, the buoyant squeezing apparatus may be self driven using an electric motor receiving power from the vessel towing the belt with the removed oil returned to the vessel by means of a pump or vacuum connection.

Of primary importance, however, is the ability of the present invention to be employed for picking up extremely large oil spills. As indicated above to adequately pick such oil spills, belts of sizes of five miles or more in length may be required to be employed. The present invention, in which the sponge remains essentially fixed in the water with means moving back and forth across the sponge squeezing the oil therefrom makes possible the application of the present invention to such large belts. For example, a belt up to five miles in length could be towed from a port to an open sea area where an oil spill has occurred. The belt, which would have considerable width — e.g. of 20 feet, would then be used in cooperation with a relatively large buoyant vessel, for example a tanker equipped with the necessary squeezing apparatus. Only through the basic steps of the present invention in which the belt remains essentially on the surface of the water at all times do belts of this size capable of picking up extremely large oil spills become practical. Furthermore, belts of this size and vessels of a large size associated therewith for squeezing oil from the belt permit operating in the open seas where considerable wave and swell activity is present.

An extension of the present invention comprises the use of a plurality of free floating large sponges. For example, a plurality of relatively large sponges having dimensions of, for example, 5 × 30 feet or more, are thrown in the water in the area of the oil spill. A vessel containing the buoyant squeezing apparatus then moves from sponge to sponge squeezing the oil from each individual sponge in a manner in which the sponge remains essentially on top of the water while the oil is being squeezed therefrom. As a result, the sponge is not lifted out of the water and problems associated of lifting a heavy sponge large distances are avoided. This further embodiment is particularly attractive in cases, where at the time of the spill, the seas are heavy and will not permit operation with a belt. In such a case, the sponges can be thrown out and then picked up and squeezed at a time when the seas have calmed down.

BRIEF DESCRIPTION OF THE DRAWINGS

FIG. 3 is a plan view illustrating a second embodiment of the present invention in which the sponge belt is towed by a mine sweeper or the like.

DETAILED DESCRIPTION OF THE PREFERRED EMBODIMENT

Figure 1:
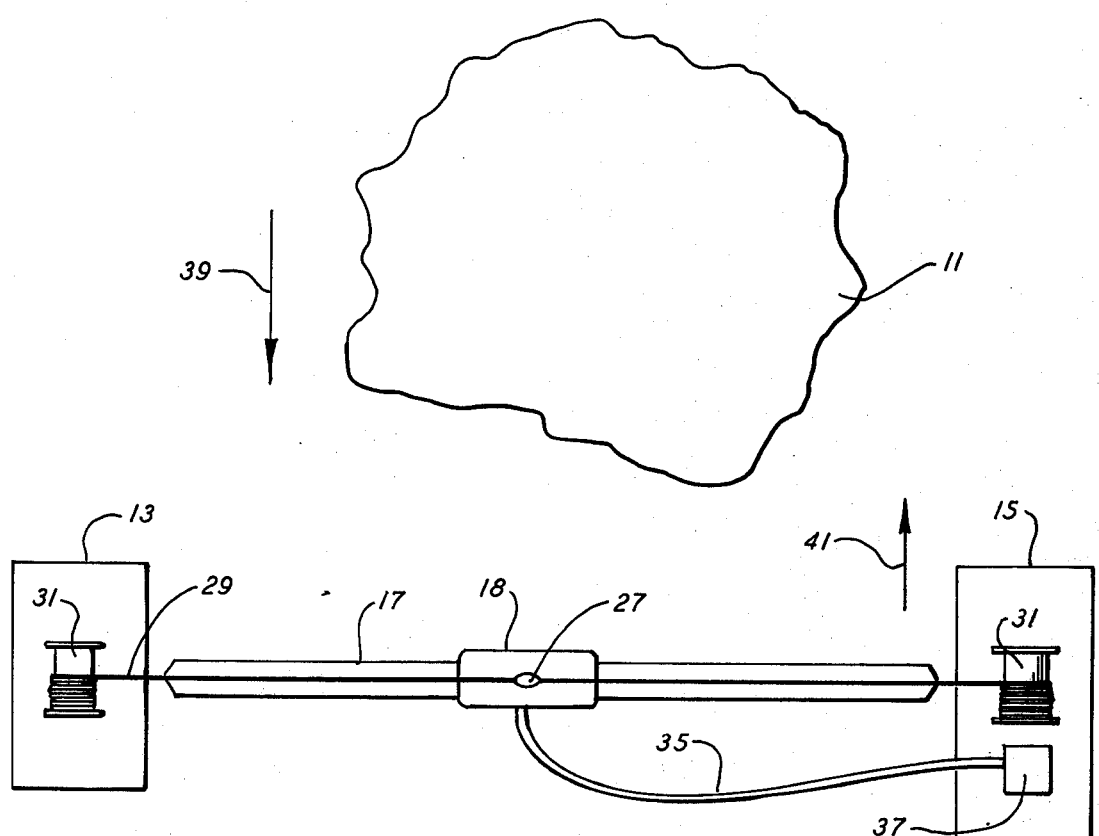
FIG. 1 is an illustration of a first embodiment of the present invention illustrating sponge like belt stretched between two buoyant vessels.

FIG. 1 illustrates a first embodiment of the present invention for removing an oil spill 11 from the surface of the water. Two buoyant vessels 13 and 15 respectively are spaced apart with a sponge-like belt 17 extended therebetween lying on the surface of the water. The belt can be of any of the materials described in the aforementioned U.S. patents. Also floating on the water with the belt passing therethrough is buoyant squeezing device shuttle 18 is an essentially hollow member having an entrance opening 19 and exit opening 20 and containing in its inside a pair of squeezing rollers 21 and 23. At each of the entrances 19 and 20 seals 25 such as rubber seals are provided to prevent the entrance of excessive amounts of the water beneath the sponge belt 17. Attached to the top of the buoyant squeezing apparatus 18 is an eye or the like 27 to which is rigidly coupled a cable 29. The cable 29 passes between winch drums 31 on the vessels 13 and 15. At least one of the drums 31 is powered in conventional fashion to cause the buoyant squeezing apparatus 18 to be moved back and forth across the belt 17 squeezing the oil therefrom. The oil removed will drip down into the bottom of the buoyant squeezing apparatus 18 from which it is removed through a line 35 coupled to a pump 37 on one of the vessels 13 or 15, in the present case on the vessel 15. From the pump it can be directed to suitable storage tanks within the vessel 15. The vessels 13 and 15 can simply be buoys on which the necessary equipment is mounted anchored in a river for example. Should the river or the current in a bay be moving in the direction of the arrow 39, so placing the apparatus would result in the water currents moving the oil spill 11 past the belt 17 whereby the oil would be picked up and transferred to the barge 15. Similarly, the vessels 13 and 15 can be barges which are towed or self propelled barges which move in the direction of the arrows 41 to sweep over the oil spill to pick it up.

Figure 3:
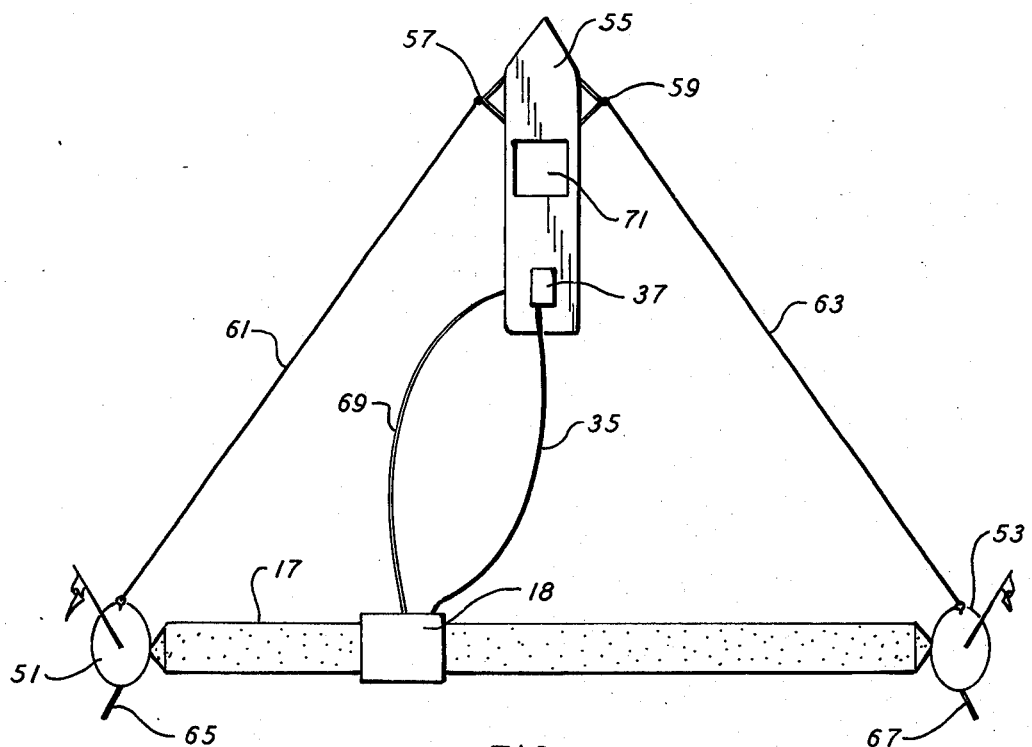

FIG. 3 illustrates a particularly advantages embodiment of the present invention. In this embodiment, a mine sweeper technique is used. As illustrated, the belt 17 is supported between two floats 51 and 53 which are towed by a ship or boat 55 from appropriate booms 57 and 59 with tow wires 61 and 63 coupling the booms and floats 51 and 53. In conventional fashion the floats 51 and 53 will have fins or rudders 65 and 67 respectively causing them to vear outward to hold the belt 17 taut therebetween. As before, the buoyant squeezing means 18 is provided and arranged for movement between the two floats 51 and 53. Although, it would be possible to mount the necessary winches on the floats 51 and 53 with power provided to the winches along the two lines 61 and 63, it is preferable that the means 18 be self propelled and for that purpose receive power over a line 69 from the ship. As before, the collected oil is returned over a line 35 to a pump 37 from which it is discharged into a tank 71 located on the ship 55.

Figure 4:
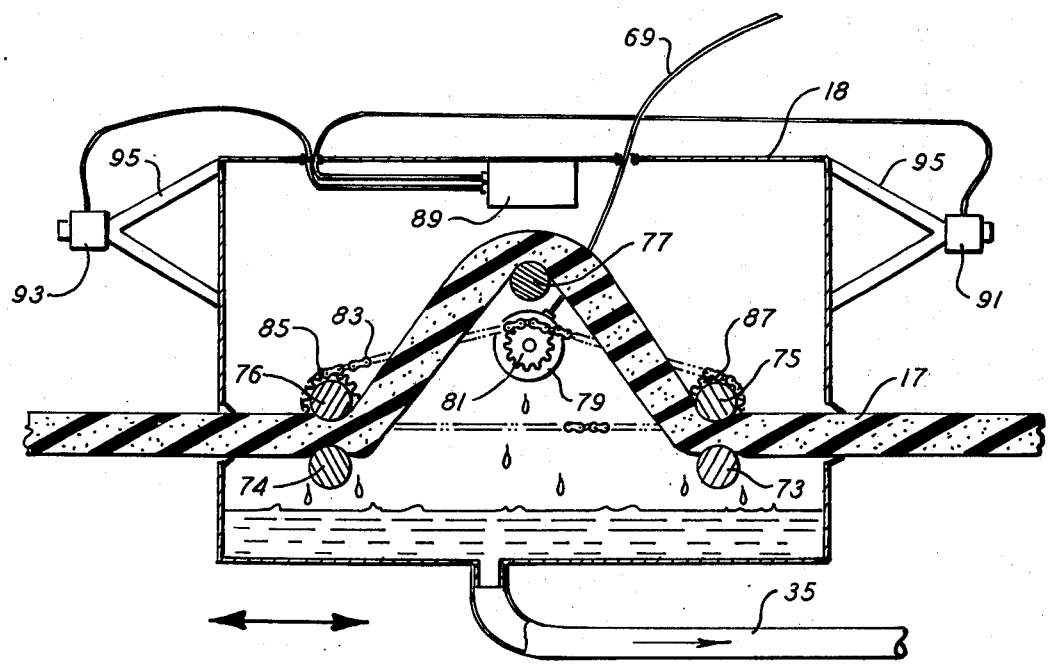
FIG. 4 is a cross-sectional view of an alternate embodiment of a squeezing apparatus according to the present invention.

An alternate form of squeezing apparatus is illustrated on FIG. 4. Although, with this apparatus, unlike that of FIG. 2 the belt does not always stay in the water, it is a vast improvement over the prior art since only a small portion of the belt is removed from the water. In this embodiment, the belt passes through a first set of rollers 73 and 75 or 74 and 76 then over a raised roller 77 and then through the other pair of rollers, i.e. the pair of rollers 73 and 75 or 74 and 76 which it had not previously passed depending on the direction of motion of the means 18. In the illustrated embodiment, the roller 75 and 76 are driven to move the means 18 back forth across 17. For this purpose, a motor 79 is provided having a drive sprocket 81 which is coupled by means of a chain 83 to drive sprockets 85 and 87 which are coupled to the rollers 75 and 76. Power for the motor 79 is provided over a suitable cable 69 through a reversing control 89. Reversing control 89 which is capable of reversing the direction of motor 79 is controlled by inputs from limit switch sensors or the like 91 and 93 located on struts 95 on each side of the means 18. In this manner, as the means 18 contacts one of the floats 51 or 53, a signal will be provided to the reversing switch 89 to change the direction of rotation of the motor 79 to cause it to go in the opposite direction across the belt 17. Alternatively, controls may be provided on the ship 55 with an operater reversing the means 18 each time it reaches the end of the belt 17.

Figure 2:
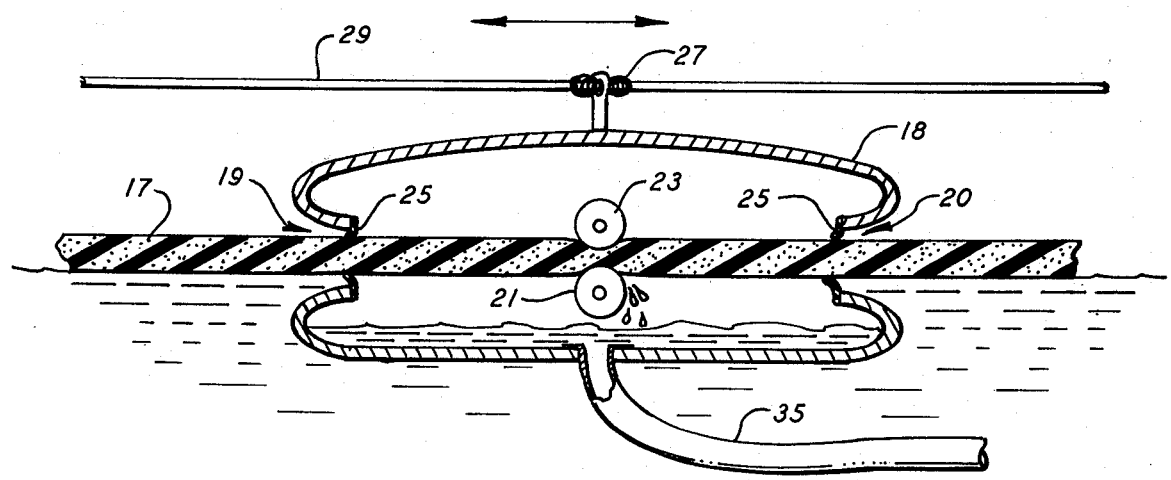
FIG. 2 is a cross-sectional view of the buoyant squeezing device according to the present invention.

It should also be noted that the embodiment of FIG. 2 can also be self driven in similar manner.

Figure 5:
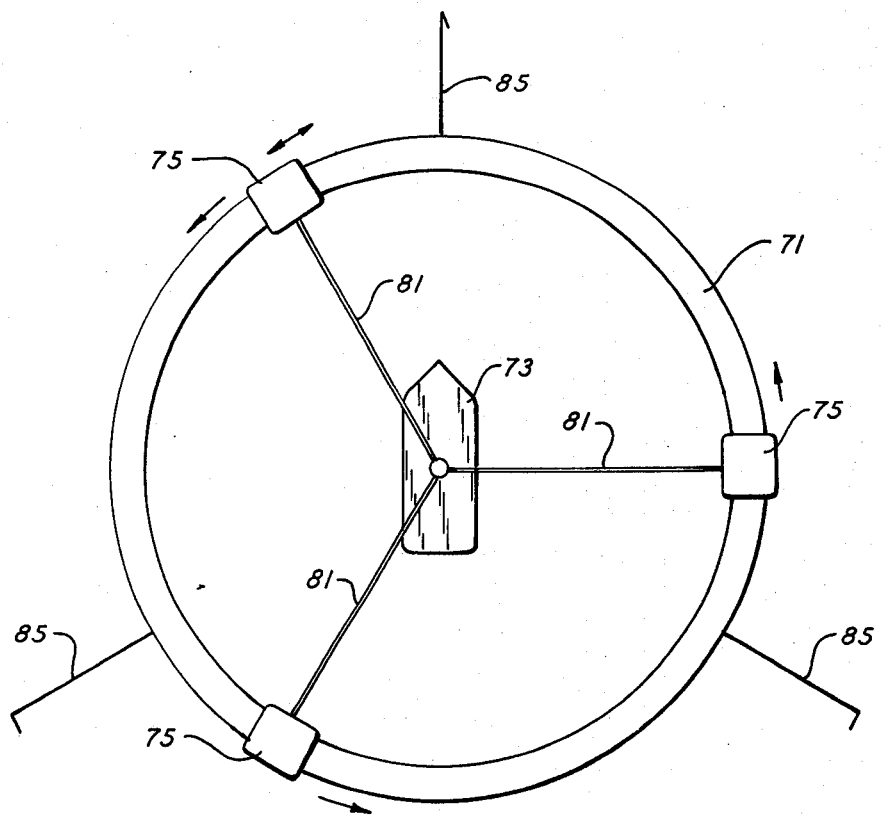
FIG. 5 is an illustration of an embodiment utilizing a circular sponge belt.

FIG. 5 illustrates a further embodiment of the present invention. In this embodiment a circular sponge belt 71 is employed. Associated therewith are a plurality of squeezing devices 75. A vessel 73 having capability for storing oil picked up and of supplying power to the squeezing devices 75 is located at the center of the circle. The squeezing devices 75 can be of the type illustrated on FIGS. 2 or 4 and will preferably be self propelled. Each is provided with power and suction from the vessel 73 over a line 81. Alternatively, device 75 can have self contained propulsion units. Line 81 can comprise an essentially tubular member containing therein a tube coupled to a pump to suck the oil out of the squeezing means 75 and, in addition power lines for powering electric motors installed in devices 75 as described above in connection with FIG. 4. The means 75 can move around the circle in one direction. Alternatively, if it is desired to anchor the circle sponge 71 using line 85 and suitable anchors or buoys which are moved in place, means 75 can shuttle back and forth between the morings which are spaced 120° apart much in the manner described in connection with the shuttling means of FIG. 3.

It should be noted, that this embodiment can find application to oil riggs with such circular sponge belt surrounding an oil rigg picking up any oil spills therefrom.

Figure 6:
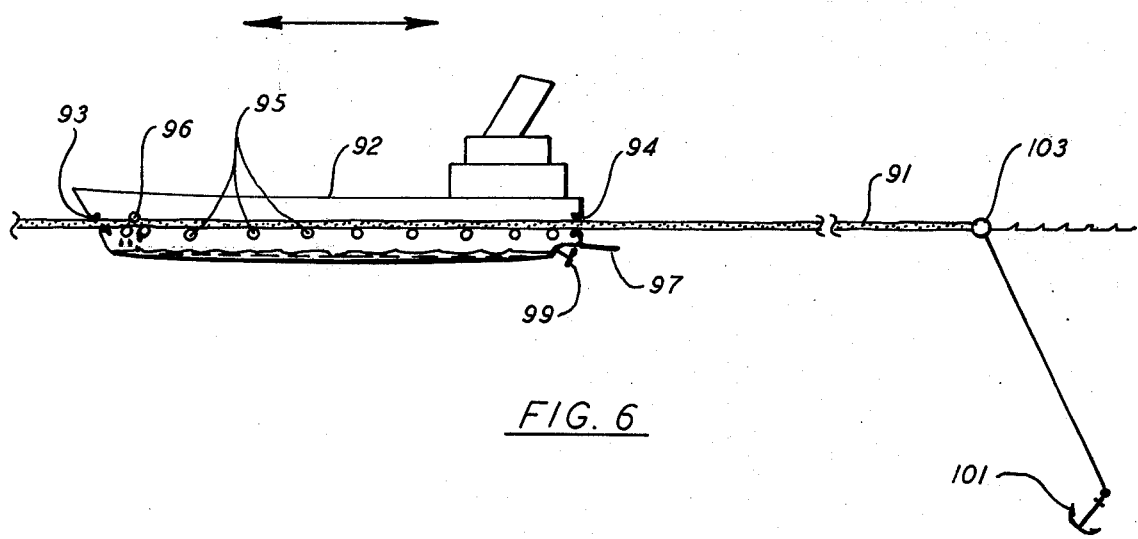
FIG. 6 is a view illustrating the manner in which the present invention can be applied to picking up extremely large oil spills in the open sea.

FIG. 6 illustrates schematically an embodiment which from a practical aspect has great importance. As noted above, oil spills of extremely large magnitude have occurred and can be expected to occur in the future. The application of the present invention to such oil spills is illustrated by FIG. 6. A very large sponge belt 91, for example, having a length of up to five miles or more and a width of up to 50 feet is towed to the area of the oil spill by a tug or the like. Associated with the large belt 91 is a tanker or other vessel, e.g. a converted LST, 92 which has openings in its bow and stern. At each of the openings 93 and 94 illustrated sealing means in the form of rollers or the like are provided to prevent entrance of water into the tanker. The tanker is constructed so as to provide a clear path therethrough for the belt 91. Within the tanker a plurality of rollers 95 are installed on which the belt rides after having the oil squeezed therefrom by squeezing rollers 96. The oil removed will, of course, be pumped into the tanks within the tanker. Means 97 will be provided at the stern to prevent interference from the propeller 99. After being transported or towed to the area of the oil spill, the belt 91 will be positioned downstream therefrom, downstream meaning at a position where the spill is most likely to drift into the belt. The belt will be threaded through the tanker 92 after which its two ends will be anchored using anchors 101. Anchors 101 may comprise conventional anchors or may be sea anchors. The latter are particularly attractive on the open seas where the depth is too great to use conventional ground tackle. Although the belt will float itself, floats 103 may be attached to the ends thereof for the purpose of anchoring. Once positioned, the tanker 92 will simply shuttle back and forth along the length of the belt squeezing out the oil as it is picked up.

Figure 7:
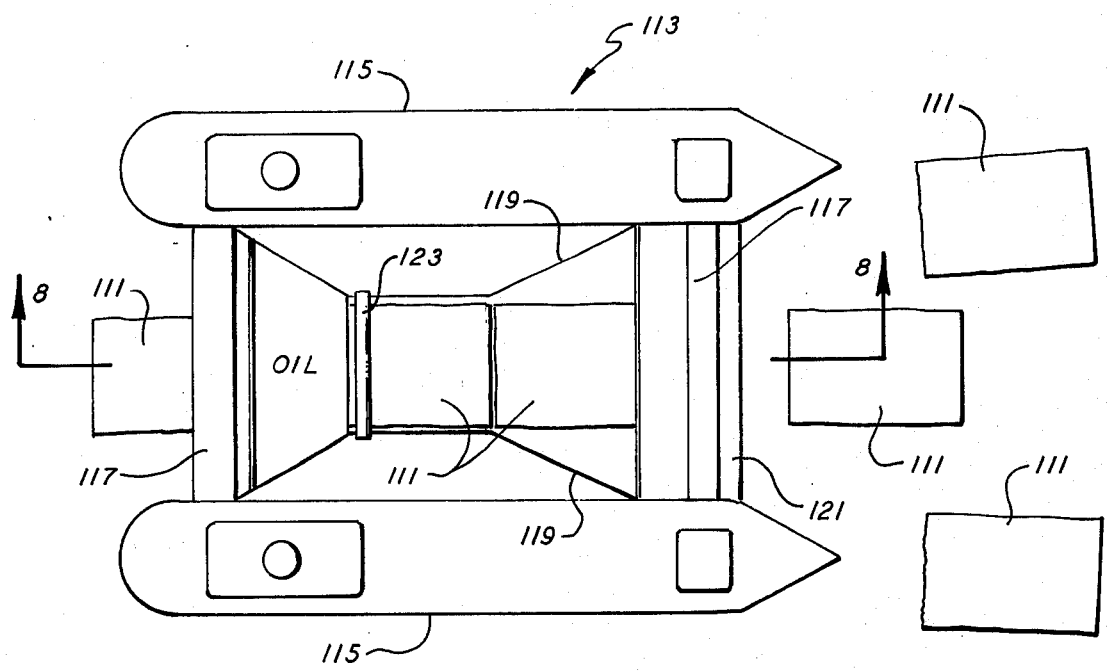
FIG. 7 is a plan view of an arrangement in which large individual sponges are used.
Figure 8:
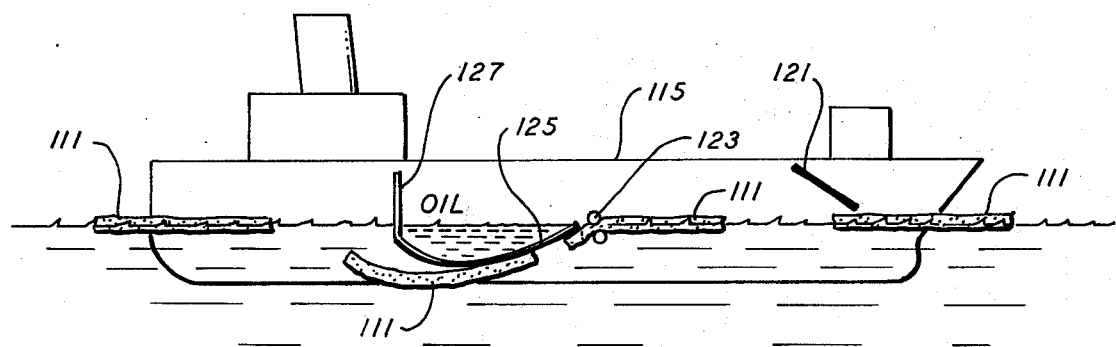
FIG. 8 is a cross-sectional view of the arrangement of FIG. 7.

FIG. 7 illustrates a particularly advangates embodiment of the present invention. In accordance with this embodiment a plurality of large sponges 111 are distributed over the surface of the water in the area of the oil spill and allowed to absorb oil. A vessel 113 comprising two tanker hulls 115 arranged in catamaran fashion coupled by appropriate coupling means 117 is provided for squeezing these sponges 111. Between the two hulls means 119 are provided to guide the sponges 111 to a squeezing apparatus 121 through which they pass and are then discharged from the stern of the vessel. In general terms, the apparatus will be similar to that disclosed above. However, a particularly advantageous form of arrangement is illustrated on the cross section of FIG. 8. A baffle plate 121 is installed sufficiently above the water line to permit a sponge 111 to pass therebelow but of sufficient height to form a breakwater for waves. The sponge 111 is guided into rollers 123 which will be driven conventionally to squeeze the belt therethrough. On the stern side of the rollers is a baffle plate 125 beneath which the sponge 111 is directed. A further baffle plate 127 is provided toward the stern so that oil will collect from the surface of the water between the rollers 123 and baffle 127 from where it can be pumped into tanks in the hulls 115. The sponge 111 is directed under water and pops to the surface behind the vessel. In this way, the sponge need never be lifted out of the water and the various problems and stresses associated therewith are avoided. The vessel moving through the water will cause sufficient relative velocity to cause the sponge 111 to be dragged under the baffle 125 and pop up to the surface of the water to absorb more oil.

Thus, a number of embodiments of an oil spill pick-up device and method in which the sponge belt remains essentially stationary in the water with buoyant squeezing means used to remove the oil has been shown. Although specific embodiments have been illustrated and described, it will be obvious to those skilled in the art that various modifications may be made without departing from the spirit of the invention which is intended to be limited solely by the appended claims.

What is claimed is:

1. Apparatus for collecting oil from the surface water comprising:

a. an elongated olephillic sponge floated on the oil and water and supported between two vessels;
b. buoyant squeezing means;
c. means for moving said buoyant squeezing means across the length of said sponge while said sponge is floated on the oil and water comprising: a cable extending over the length of said sponge belt, said cable rigidly coupled to said buoyant squeezing means, and means for pulling said cable back and forth to move said buoyant squeezing means back and forth over said sponge; and
d. means for collecting the oil squeezed out from said buoyant squeezing means.

2. Apparatus according to claim 1 and further including means for removing the oil squeezed out from said buoyant squeezing means.

3. Apparatus according to claim 2 wherein said vessels comprise barges and wherein said means for removing oil from said buoyant squeezing comprises means for pumping oil from said means to at least one of said barges.

4. Apparatus according to claim 3 wherein said barges are self propelled barges.

5. Apparatus according to claim 2 wherein said vessels comprise buoyant floats and further including a self-propelled vessel towing said floats.

* * * * *